United States Patent
Huh et al.

(10) Patent No.: US 10,148,635 B2
(45) Date of Patent: Dec. 4, 2018

(54) SYSTEMS, APPARATUSES, METHODS, AND NON-TRANSITORY COMPUTER READABLE MEDIA FOR AUTHENTICATING USER USING HISTORY OF USER

(71) Applicant: LINE Corporation, Shibuya-ku, Tokyo (JP)

(72) Inventors: Seonggu Huh, Seongnam-si (KR); Iryoung Jeong, Seongnam-si (KR); Ho Sung Kang, Seongnam-si (KR)

(73) Assignee: Line Corporation, Tokyo (JP)

( * ) Notice: Subject to any disclaimer, the term of this patent is extended or adjusted under 35 U.S.C. 154(b) by 54 days.

(21) Appl. No.: 15/251,256

(22) Filed: Aug. 30, 2016

(65) Prior Publication Data

US 2017/0111341 A1    Apr. 20, 2017

(30) Foreign Application Priority Data

Oct. 15, 2015    (KR) ........................ 10-2015-0143917

(51) Int. Cl.
| | |
|---|---|
| G06F 21/00 | (2013.01) |
| H04L 29/06 | (2006.01) |
| G06F 17/30 | (2006.01) |
| H04W 4/14 | (2009.01) |
| G06F 21/31 | (2013.01) |

(52) U.S. Cl.
CPC ........ *H04L 63/08* (2013.01); *G06F 17/30867* (2013.01); *G06F 17/30876* (2013.01); *G06F 21/316* (2013.01); *H04L 63/123* (2013.01); *H04W 4/14* (2013.01); *G06F 2221/2101* (2013.01); *H04L 63/083* (2013.01)

(58) Field of Classification Search
None
See application file for complete search history.

(56) References Cited

U.S. PATENT DOCUMENTS

| | | | |
|---|---|---|---|
| 2005/0216769 A1* | 9/2005 | Matsuoka | H04L 63/0823 726/5 |
| 2008/0065993 A1* | 3/2008 | Huang | G06F 8/71 715/745 |
| 2012/0214442 A1* | 8/2012 | Crawford | H04W 12/06 455/411 |
| 2013/0260893 A1 | 10/2013 | Shin et al. | |
| 2013/0332543 A1 | 12/2013 | Shin et al. | |
| 2014/0019540 A1 | 1/2014 | Shin et al. | |

FOREIGN PATENT DOCUMENTS

| | | |
|---|---|---|
| JP | 2009/288823 A | 12/2009 |
| KR | 2005/0055484 A | 6/2005 |
| KR | 2010/0108847 A | 10/2010 |
| WO | WO-2015/065001 A1 | 5/2015 |

OTHER PUBLICATIONS

Korea Office Action #10-2015-0143917 dated Jul. 29, 2016.

* cited by examiner

*Primary Examiner* — David Le
(74) *Attorney, Agent, or Firm* — Harness, Dickey & Pierce, P.L.C.

(57) ABSTRACT

Provided is a system and method for authenticating a user using history of the user. One or more example embodiments provide a system and method that enables a server to perform an authentication or an additional authentication of a user based on use history of the user associated with a service when the server provides the service to an electronic device over a network.

18 Claims, 12 Drawing Sheets

SYSTEMS, APPARATUSES, METHODS, AND NON-TRANSITORY COMPUTER READABLE MEDIA FOR AUTHENTICATING USER USING HISTORY OF USER

CROSS-REFERENCE TO RELATED APPLICATION(S)

This U.S. non-provisional application claims the benefit of priority under 35 U.S.C. § 119 to Korean Patent Application No. 10-2015-0143917 filed Oct. 15, 2015, in the Korean Intellectual Property Office (KIPO), the entire contents of which are incorporated herein by reference.

BACKGROUND

Field

One or more example embodiments relate to systems, apparatuses, methods, and/or non-transitory computer readable media for authenticating a user using the history of the user.

Description of Related Art

A variety of related art relate to methods for authenticating a user. For example, in the related art, a user may be authenticated using an identifier and a password directly input by the user, or using an additional authentication device such as a one-time use password (OTP) generating device and the like. In detail, to prevent the cumbersomeness related to the inputting of a credit card number, an expiration date, a card password, a mailing address, etc., to process a payment using a credit card on the Internet, and to prevent a probable hacking of various personal information submitted and/or transmitted over the Internet, there is a desired for a technique and/or a service capable of simplifying the procedure for processing credit card transactions and/or OTP, instead of inputting a large amount of information, and thereby preventing and/or reducing a hacking risk.

SUMMARY

One or more example embodiments provide a system and method that enables a server to perform an authentication or an additional authentication of a user based on use history of the user associated with a service when the server provides the service to an electronic device over a network.

At least one example embodiment provides a system, the system including a memory configured to store computer-readable instructions; and at least one processor configured to execute the computer-readable instructions to provide a service to an electronic device of an authenticated user over a network, generate use history information of the user regarding the provided service, store the generated use history information in a database in association with an identifier of the user, search for the use history information of the user stored in the database in association with the identifier of the user, in response to a request for the service from the electronic device or another electronic device using the identifier of the user, generate user verification information based on the use history information of the user, transmit the user verification information to the electronic device or the other electronic device, and determine whether to authenticate the user in response to the request for the service based on a reply received from the electronic device or the other electronic device with respect to the user verification information.

The at least one processor may be further configured to execute the computer readable instructions to generate, as the user verification information, query data that includes at least one correct answer and at least one incorrect answer associated with the use history information of the user, and authenticate the user in response to receiving, from the electronic device or the other electronic device, a reply in which the correct answer is selected for the query data.

The system may further include the service includes a messaging service, the messaging service that is configured to set a communication session for a plurality of electronic devices, process message transmission and reception between at least two of the plurality of electronic devices through the set communication session, provide a plurality of objects to the plurality of electronic devices, and transmit information about a selected object at a first electronic device from among the plurality of objects to a second electronic device through the communication session. The at least one processor may be further configured to execute the computer readable instructions to store, as the use history information, information regarding the selected object, or an object transmitted to the electronic device of the user or the other electronic device through the communication session.

The at least one processor may be further configured to execute the computer readable instructions to generate, as the user verification information, query data, the query data including information extracted from at least one object from the use history information and requesting selection of a single object from among a desired number of objects including the extracted object, and authenticate the user in response to receiving, from the electronic device or the other electronic device, a reply indicating that the extracted object is selected as a reply to the query data.

The at least one processor may be further configured to execute the computer readable instructions to calculate a number of times that a corresponding object was selected for each object selected by the user or a number of times that a corresponding object is transmitted for each object transmitted to the electronic device of the user, based on the use history information, and extract the at least one object based on the calculated number of times.

The service may include a messaging service, the messaging service configured to set a communication session for a plurality of electronic devices and process message transmission and reception between at least two of the plurality of electronic devices. The at least one processor may be further configured to execute the computer readable instructions to store a message transmission/reception history for at least one communication session or a message transmission/reception history for each chat target associated with the messaging service as the use history information.

The at least one processor may be further configured to execute the computer readable instructions to generate, as the user verification information, query data for extracting at least one communication session or chat target from the use history information based on the message transmission/reception history, request selection of a single set of data from a desired number of sets of data including data about the extracted communication session or data about the extracted chat target, and authenticate the user in response to receiving, from the electronic device or the other electronic device, a reply indicating that the data about the extracted communication session or the data about the extracted chat target is selected as a reply to the query data.

The at least one processor may be further configured to execute the computer readable instructions to calculate at least one of a number of times that messages have been transmitted from the user to the chat target and a number of times that messages have been received by the user from the chat target for each chat target based on the use history information or to calculate a number of times that the electronic device of the user and an electronic device of the chat target are connected to the same communication session for each communication session, and extract user data based on the calculated number of times.

The at least one processor may be further configured to execute the computer readable instructions to store data about a previous electronic device used by the user to utilize the service as the use history information, generate, as the user verification information, query data, the query data including a request for selection of a single set of data from among a plurality of sets of data about a desired number of different electronic devices, the plurality of sets of data including the data about the previous electronic device, and authenticate the user in response to receiving, from the electronic device or the other electronic device, a reply indicating that the data about the previous electronic device is selected as a reply to the query data.

The data about the previous electronic device may include photo data taken of an electronic device of the same model as the previous electronic device.

The at least one processor may be further configured to execute the computer readable instructions to collect an Internet Protocol (IP) address previously used at the electronic device of the user for connection to the service, store the collected IP address in the database, and verify an IP address currently used at the electronic device having requested the service or the other electronic device for connection to the service using the identifier of the user, the verified IP address used to authenticate the user based on authentication information received together with the identifier of the user if the verified IP address is stored in the database, and perform a primary authentication of the user based on the authentication information received together with the identifier of the user, and perform a secondary authentication of the user by further using a reply to the user verification information if the verified IP address is not stored in the database.

The at least one processor may be further configured to execute the computer readable instructions to store information about content uploaded or downloaded by the user through the service as the use history information, generate, as the user verification information, query data, the query data including data extracted regarding the content uploaded or downloaded by the user from the use history information, and a request for selecting a single set of data from among a desired number of sets of data including data about the extracted content, and authenticate the user in response to receiving, from the electronic device or the other electronic device, a reply indicating that the data about the extracted content is selected as a reply to the query data.

At least one example embodiment also provides a user authentication method including providing, using at least one processor, a service to an electronic device of an authenticated user over a network, generating, using the at least one processor, use history information of the user regarding the provided service, ring, using the at least one processor, the generated use history information in a database in association with authentication information of the user, searching, using the at least one processor, for the use history information of the user stored in the database in association with the authentication information of the user in response to a request for the service from the electronic device or another electronic device based on the authentication information of the user, generating, using the at least one processor, user verification information based on the use history information of the user, transmitting, using the at least one processor, the user verification information to the electronic device or the other electronic device, and determining, using the at least one processor, whether to authenticate the user in response to the request for the service, based on a reply received from the electronic device or the other electronic device with respect to the user verification information.

At least one example embodiment also provides a user authentication method including connecting, using an electronic device, to a server configured to provide a service, and providing a user interface for receiving authentication information of a user over a network, transmitting, using the electronic device, authentication information input through the user interface to the server, receiving, using the electronic device, user verification information corresponding to the authentication information, displaying, using the electronic device, the received user verification information on a screen associated with the electronic device, and transmitting, using the electronic device, reply information input from a user of the electronic device with respect to the user verification information to the server, wherein the user verification information is generated at the server based on use history information of the user for the service, and whether to authenticate the user is determined at the server based on the reply information.

According to at least some example embodiments, a server may perform an authentication or an additional authentication of a user based on use history of the user associated with a service when the server provides the service to an electronic device over a network.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
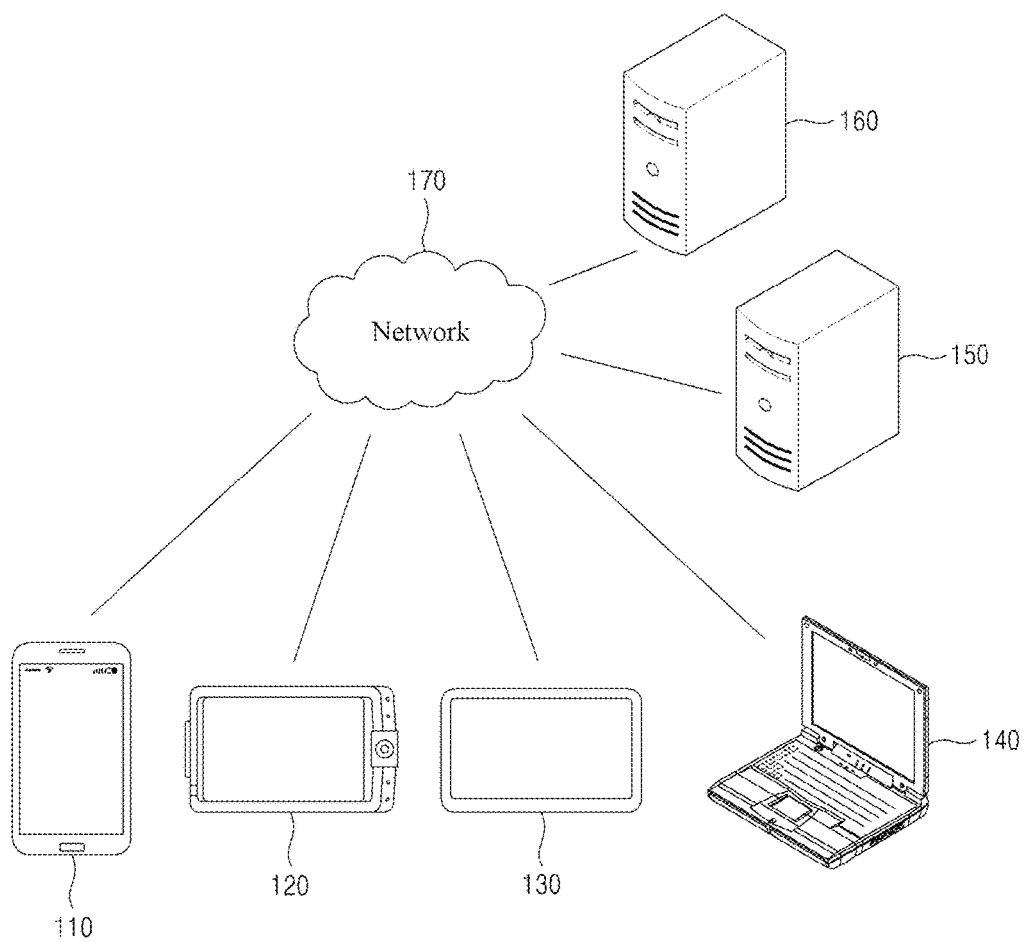
FIG. 1 illustrates an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above.

Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Various example embodiments relate to technology for recommending a meeting place based on various information related to a user, such as a user's calendar/meeting appointment information, but are not limited thereto. In detail, some of the example embodiments relate to methods, systems, apparatuses, and/or non-transitory computer-readable media that may provide appointment information of a meeting associated with users to affiliated stores, may receive recommendation information about a meeting place from the affiliated stores, may provide the received recommendation information to the users, etc.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as only an example and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a personal navigation device, a personal computer, a laptop computer, a digital broadcasting terminal (e.g., a television set-top box), a personal digital assistant (PDA), a portable multimedia player (PMP), a tablet PC, an Internet of Things (IoT) device, a wearable device, a virtual reality (VR) device, and the like. For example, the electronic device 110 may communicate with other electronic devices 120, 130, and 140, and/or the servers 150 and/or 160 over the network 170 in a wired communication manner (e.g., ethernet cable, fiber-optic cable, etc.) or in a wireless communication manner (e.g., wireless network, cellular network, etc.).

The communication protocol is not particularly limited and may include a communication method that uses near field communication (NFC) between devices as well as a communication method using a communication network, for example, a mobile communication network, the wired Internet, the wireless Internet, a broadcasting network, a satellite network, etc. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of a bus network, a star network, a ring network, a mesh network, a star-bus network, a tree or hierarchical network, and the like. However, these are only examples and the example embodiments are not limited thereto.

Each of the servers 150 and 160 may be configured as a computer apparatus, or a plurality of computer apparatuses interconnected and configured to perform cooperative and/or distributed processing, that provides instructions, codes, file, contents, services, and the like through communication with the plurality of electronic devices 110, 120, 130, and/or 140 over the network 170.

For example, the server 160 may provide a file for installing a software application to the electronic device 110 connected over the network 170. In this case, the electronic device 110 may install the application using one or more files provided from the server 160. The electronic device 110 may use a service and/or content provided from the server 150 by connecting to the server 150 under the control (e.g., the direction and/or instruction) of at least one program, for example, a browser or the installed application, and an operating system (OS) included in the electronic device 110. For example, in response to a service request message transmitted from the electronic device 110 to the server 150 over the network 170 under the control of the application, the server 150 may transmit a code corresponding to the service request message to the electronic device 110. The electronic device 110 may provide content to a user by displaying a code-based screen under the control of the application. As another example, the server 150 may set a communication session for a messaging service and may route the transmission and/or reception of a message between the plurality of electronic devices 110, 120, 130, and 140 through the set communication session.

Figure 2:
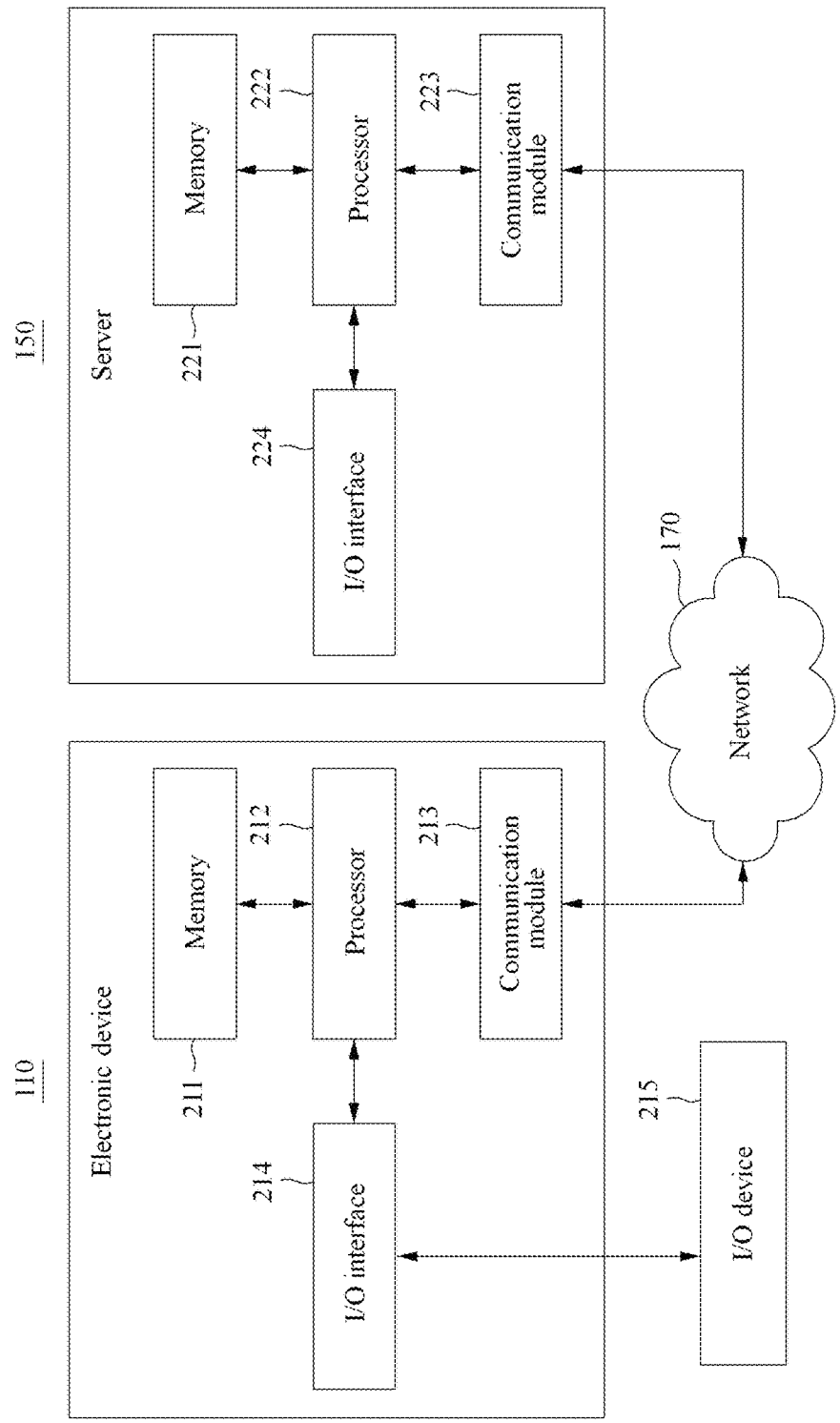
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server, but the example embodiments are not limited thereto. The electronic devices 120, 130, and 140, and/or the server 160 may have the same or similar configuration to the electronic device 110 and/or the server 150.

Referring to FIG. 2, the electronic device 110 may include a memory 211, at least one processor 212, a communication module 213, and an input/output (I/O) interface 214, and the server 150 may include a memory 221, at least one processor 222, a communication module 223, and an I/O interface 224. The memory 211, 221 may include a permanent mass storage device, such as random access memory (RAM), read only memory (ROM), a disk drive, a solid state drive, a flash memory device, etc., as a non-transitory computer-readable storage medium. Also, an OS and at least one program code, for example, the aforementioned code for browser or the application installed and executed on the electronic device 110, may be stored in the memory 211, 221. Such software constituent elements may be loaded from another non-transitory computer-readable storage medium separate from the memory 211, 221 using a drive mechanism. The other non-transitory computer-readable storage medium may include, for example, a floppy drive, a disk, a tape, a Blu-ray/DVD/CD-ROM drive, a memory card, etc. According to other example embodiments, software constituent elements may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server, that provides an installation file of the application.

The at least one processor 212, 222 (hereinafter referred to in the singular form for the sake of brevity) may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device such as the memory 211, 222. The processor 212, 222 may be a single processor and/or processing device, a plurality of processors interconnected across a physical bus, a network, and/or in any other distributed manner, a single processor including a plurality of processing cores, a plurality of processor each including one or more processing cores, etc.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a streaming service request for content, generated based on a program code stored in the storage device such as the memory 211, to the server 150 over the network 170 under control of the communication module 213. Inversely, a control signal, an instruction, content, file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214, 224 may be a device used for interface with an I/O device 215. For example, an input device may include a keyboard, a mouse, etc., and an output device may include a device, such as a display and/or projector for displaying a communication session of an application. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. For example, the electronic device 110 may include at least a portion of the I/O device 215, or may further include other constituent elements, for example, a transceiver, a global positioning system (GPS) module, a camera, a variety of sensors, a database, and the like.

Figure 3:
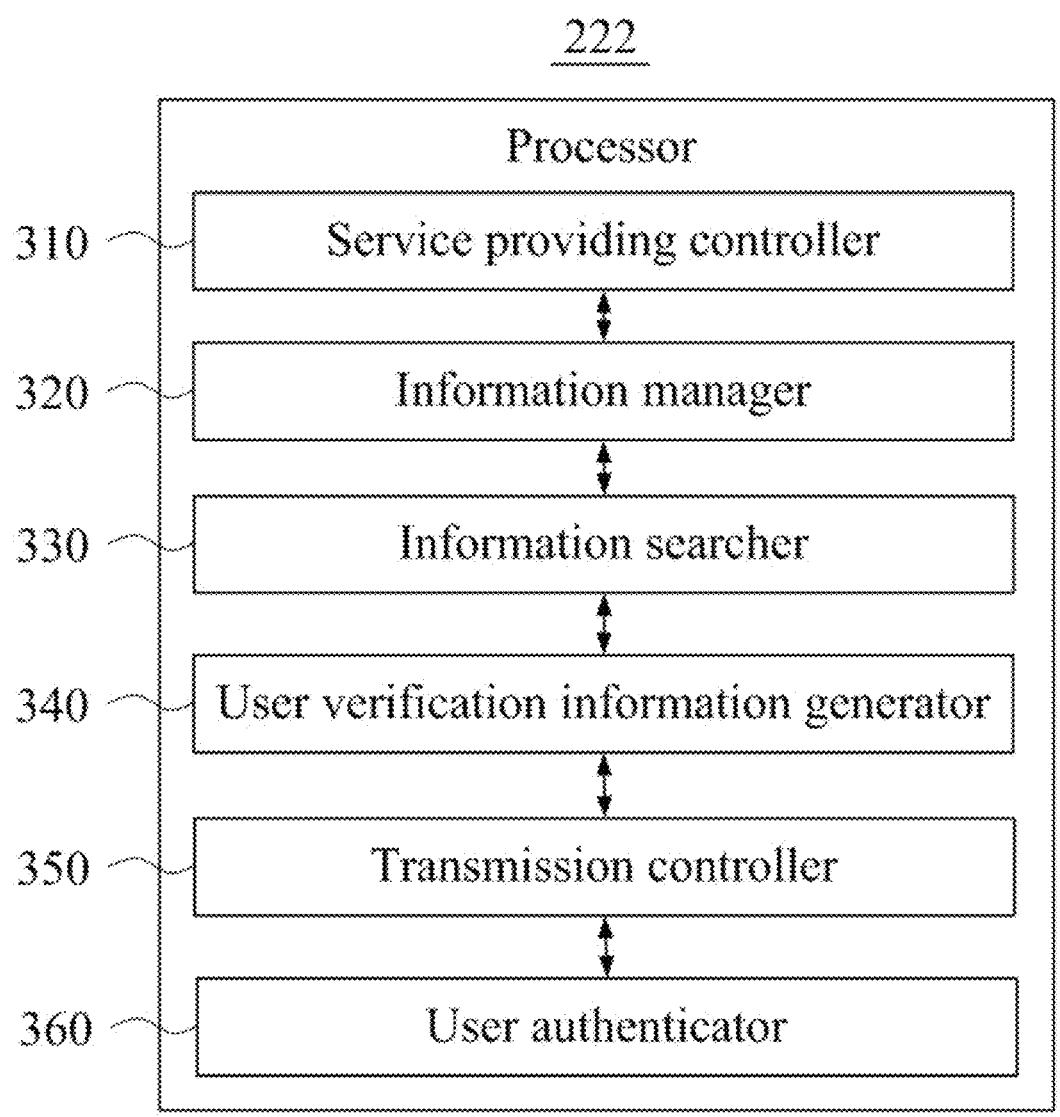
FIG. 3 is a block diagram illustrating an example of a constituent element includable in at least one processor of a server according to at least one example embodiment.
Figure 4:
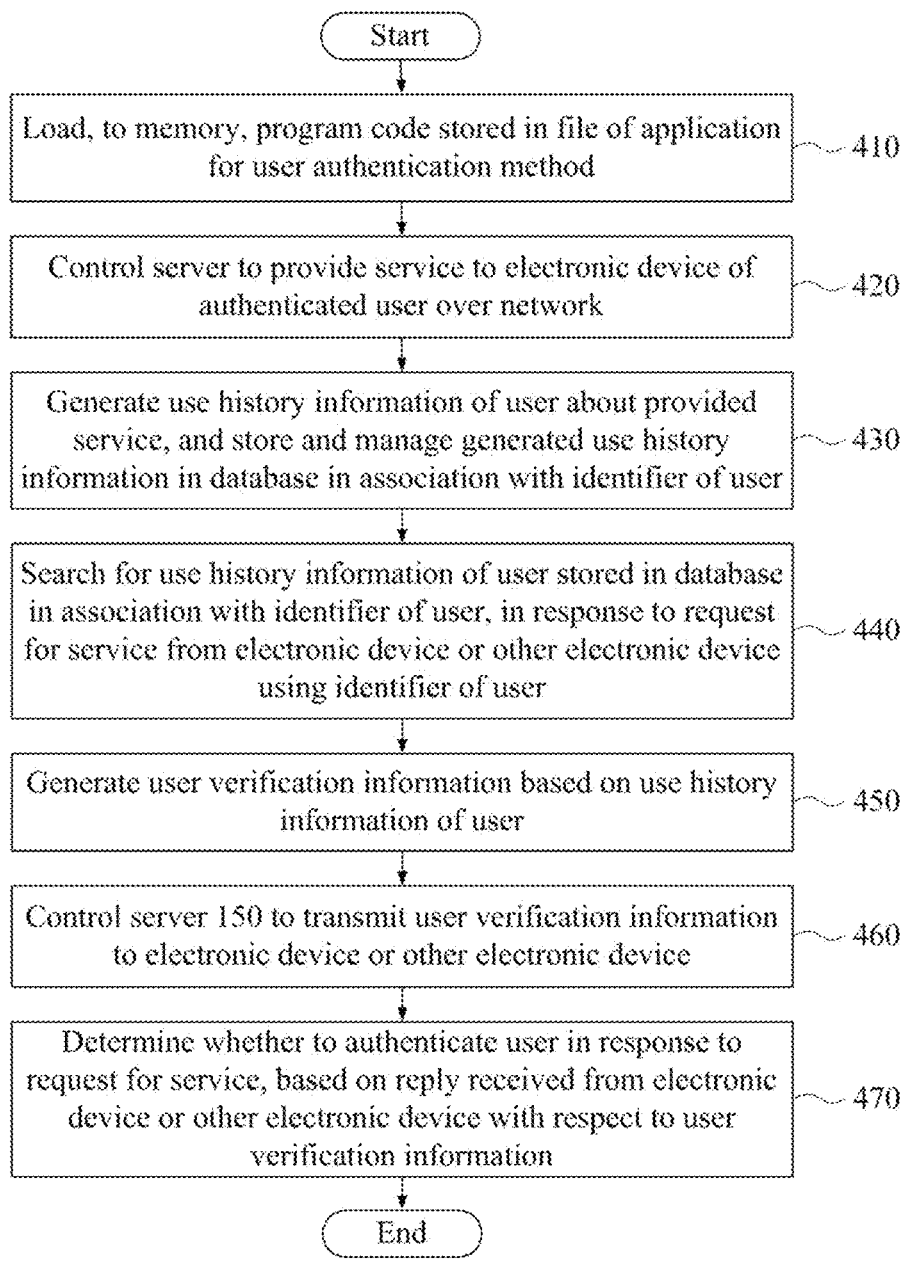
FIG. 4 is a flowchart illustrating an example of a method performed at a server according to at least one example embodiment.

FIG. 3 is a block diagram illustrating an example of a constituent element includable in at least one processor of a server according to at least one example embodiment, and FIG. 4 is a flowchart illustrating an example of a method performed at a server according to at least one example embodiment. Referring to FIG. 3, the processor 222 of the server 150 may include a service providing controller 310, an information manager 320, an information searcher 330, a user verification information generator 340, a transmission controller 350, and/or a user authenticator 360. The processor 222 and the constituent elements of the processor 222 are specially configured to control the server 150 to perform operations 410 through 470 included in the method of FIG. 4, and may be configured to operate through at least one program code and an operating system (OS) included in the memory 221. Here, the constituent elements of the processor 222 may represent different functions performed at the processor 222.

In operation 410, the processor 222 may load, to the memory 221, a program code stored in a file of an application for the user authentication method. For example, the application may be installed on the server 150 through a program file. In response to executing the application on the server 150, the processor 222 may load the program code to the memory 221 thereby transforming the processor 222 into a special purpose processor including the service providing controller 310, the information manager 320, the information searcher 330, the user verification information generator 340, the transmission controller 350, and/or the user authenticator 360. Here, the service providing controller 310, the information manager 320, the information searcher 330, the user verification information generator 340, the transmission controller 350, and/or the user authenticator 360 included in the processor 222 may be configured to perform operations 420 through 470 by executing a portion corresponding to the program code loaded to the memory 221. Hereinafter, that the constituent elements of the processor 222 control the server 150 may be understood as that the processor 222 controls other constituent elements of the server 150. For example, the processor 222 may control the communication module 223 included in the server 150 such that the server 150 may communicate with the electronic device 110 and/or the server 160.

In operation 420, the service providing controller 310 may control the server 150 to provide a service to an electronic device of an authenticated user over the network 170. The service provided from the server 150 may include a variety of services, for example, a messaging service, a game service, a social network service (SNS), a web portal service, a website provider service, an online/streaming music and/or video service, a cloud storage service, a search engine service, etc. A user authentication process may be included prior to providing the service, and the service may be provided to the authenticated user in operation 420. The user authentication process prior to operation 420 may employ a user authentication method according to at least one example embodiment discussed below. Alternatively or additionally, one of conventional authentication methods, for example, a method of authenticating a user based on authentication information, such as a user identifier and a password of the user, may be selectively used. For example, the user authentication method according to various example embodiments may employ a use history (e.g., a usage history and/or user history) of the user about the service. Thus, when the use history of the user is accumulated up to a desired and/or required level (e.g., when a threshold level is reached), the user's use history of the service may be utilized. Accordingly, according to at least one example embodiment, the conventional authentication methods may be applicable when the use history is not sufficiently accumulated. Also, the user authentication method according to example embodiments may employ conventional authentication methods as a secondary authentication method for providing and/or enforcing security for the service. That is, the server 150 may perform a primary authentication of the user using the user authentication method according to example embodiments and may perform a secondary authentication of the user using the conventional authentication methods, or vice versa. Here, the secondary authentication of the user may be selectively performed based on a desired and/or preset condition. For example, if the user continuously connects to the server 150 using the existing first electronic device, the server 150 may authenticate the user using the primary authentication method. However, if the user requests connection to the server 150 using a second electronic device instead of using the existing first electronic device, the server 150 may perform both the primary authentication and the secondary authentication, thereby enhancing the security through user authentication.

In operation 430, the information manager 320 may generate use history information of the user about the provided service, and may store and manage the generated use history information in a database in association with an identifier of the user. The database may be installed on the server 150 and/or may be installed on one or more computer systems separate from the server 150 but connected to the server 150 through the network 170. In this case, the information manager 320 may control the server 150 to store and manage the use history information in the database in association with an unique identifier of the user through communication with the separate system.

The use history information of the user may be acquired through interaction with the user on the service provided from the server 150 to the user through the electronic device, and may be at least one of any type of recordable information, such as information related to the user and/or the user's actions using the service, user behavior information, etc. For example, at a messaging service, information about an emoticon or a sticker selected by the user may be utilized as use history information, information regarding the contents of chats, posts, messages, etc., made by the user may be utilized as use history information, information regarding content selected, viewed, listened to, etc., may be utilized as use history information, information regarding services/functionality used and/or purchases made using the service may be utilized as use history information, etc. Moreover, information related to users associated with the user, for example, a user name (e.g., a chat name, etc.), a profile photo, a telephone number, profile contents, shared profile information, etc., about a friend/buddy/acquaintance/etc. that the user chats with through a chatroom may also be utilized as use history information. Additionally, information about a name of a chatroom, website, portal, forum, channel, etc., accessed by the user or an electronic device used by the user to connect to the service may be utilized as use history information. The use history information may be accumulated and stored in the database based on the date and/or time information at which each piece of information has occurred and/or was acquired. For example, if information about stickers selected by the user is accumulated in the database, the server 150 may verify a sticker that is frequently used by the user. The use history information will be further described.

In operation 440, in response to a request for the service from the electronic device or the other electronic device using the identifier of the user, the information searcher 330 may search for the use history information of the user stored in the database in association with the identifier of the user. For example, if the user has finished accessing the service by logging-out of the service and requests the service again through a log-in process, the server 150 may perform a primary authentication of the user based on the identifier and the password of the user input in the log-in process. The server 150 may search the database for the use history information stored in association with the identifier of the user to perform a secondary authentication of the user. In the above sticker example, the server 150 may obtain information about stickers previously selected by the user by searching the database for the stickers stored in association with the identifier of the user. As an example, if telephone numbers of other users of the service, for example, friends of the user, the user has chatted with at a messaging service are stored as use history information, the server 150 may search the database for the telephone numbers stored in association with the identifier of the user.

In operation 450, the user verification information generator 340 may generate user verification information based on the use history information of the user. The user verification information refers to information used to verify the user for the user authentication. The user verification information may not be information that is determined in advance, such as a password, and may be generated (e.g., dynamically generated and/or generated in real-time, etc.) to be different based on information accumulated as use history information of the user. In other words, the user verification information is based on the use history information of the user and changes based on changes in the use history information of the user, such as when the user continues to use the service. For example, the server 150 may verify information about a sticker most frequently used by the user from use history information, the other users that the user most frequently contacts from use history information, the services that the user most frequently uses from use history information, the websites that the user most frequently visits from use history information, etc., and may generate user verification information based on the verified information. Here, use history information, e.g., information about the sticker most frequently used by the user from the perspective of the user may be information empirically inducible and/or produced by the user over time, and is not a static security mechanism that must be separately remembered and/or memorized, such as a password.

In operation 460, the transmission controller 350 may control the server 150 to transmit the user verification information to the electronic device (e.g., a primary electronic device associated with the user, an electronic device that has been registered with the service as being associated with the user, an electronic device that has been previously used by the user to access the service, etc.) or the other electronic device (e.g., an electronic device that the user has not previously used to access the service with, an electronic device that is not registered with the service, a secondary electronic device, etc.). Here, the user verification information may be displayed on at least one screen of the electronic device or the other electronic device and an input of a reply to the user verification information may be requested.

In operation 470, the user authenticator 360 may determine whether to authenticate the user in response to the request for the service, based on a reply received from the electronic device or the other electronic device with respect to the user verification information. That is, whether to authenticate the user may be determined based on a reply (e.g., response) of the user as to the user verification information.

The server 150 may generate and provide the user verification information that requests the user for the empirically inducible (e.g., produced) reply through the use history information of the user, and may determine whether to authenticate the user based on the reply to the user verification information.

In detail, the user verification information generator 340 may generate the user verification information to include query data that includes a correct answer and an incorrect answer associated with the service use of the user, based on the use history information in operation 450. Here, if a reply in which the correct answer is selected for the query data is received from the electronic device or the other electronic device, the user authenticator 360 may authenticate the user in response to the request for the service.

Hereinafter, a variety of example embodiments for authenticating a user based on use history information of the user will be described.

According to an example embodiment, a service provided from the server 150 may include, for example, a messaging service of setting a communication session for electronic devices and processing message transmission and reception between the electronic devices through the set communication session and providing a plurality of objects to the electronic devices and transmitting information about an object selected at a first electronic device from among the plurality of objects to a second electronic device through the communication session. For example, the messaging service may provide objects, such as an emoticon, a sticker, icons, photos, video, audio, texts, VR content, other content, etc., to a user, and may provide an object selected by the user from among the provided objects to other users of a chatroom through message transmission and reception.

Here, in operation 430, the information manager 320 may store and manage, as the use history information, information about an object selected by the user from among the plurality of objects provided from the messaging service and/or information about an object transmitted to the electronic device of the user through a communication session.

Figure 5:
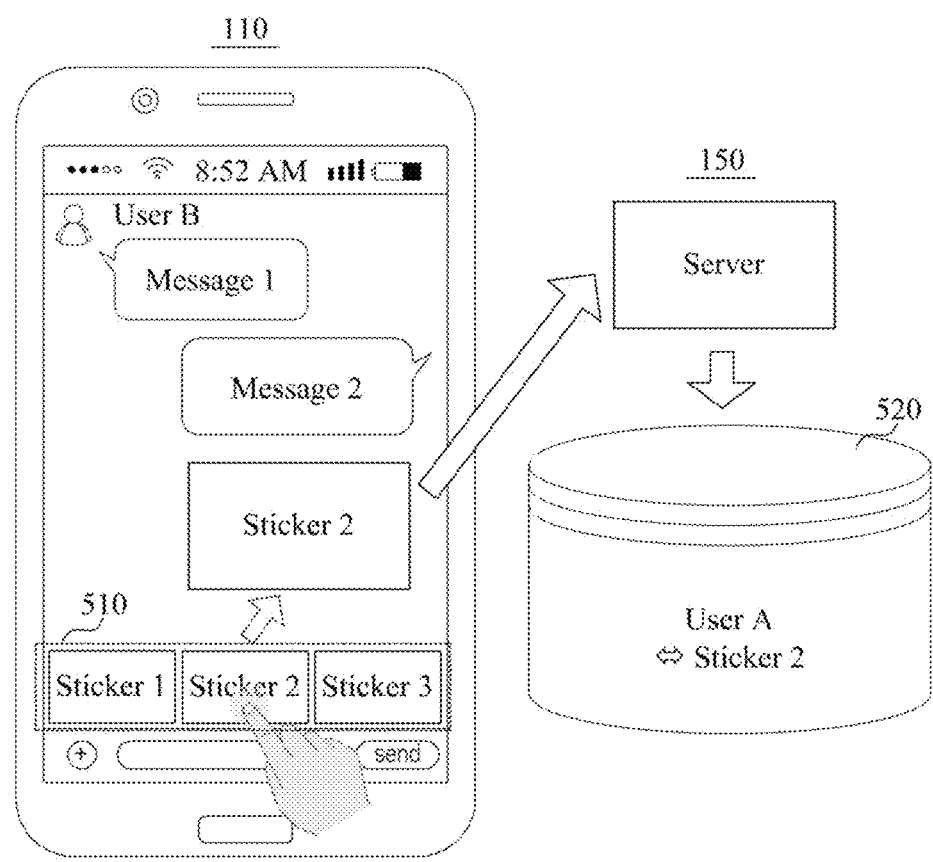
FIG. 5 illustrates an example of a process of storing use history information according to at least one example embodiment.

FIG. 5 illustrates an example of a process of storing use history information according to at least one example embodiment. Referring to FIG. 5, a plurality of stickers, for example, sticker 1, sticker 2, and sticker 3 as indicated by a box 510 with dotted lines, is provided to a user of the electronic device 110 through a service, such as a messaging service, but the example embodiments are not limited thereto and may use any other form of use history information and/or service. The user of the electronic device 110 may be identified using an identifier, e.g., "user A". Although various additional stickers may be provided, only three stickers are illustrated for clarity of description. In response to the user of the electronic device 110 selecting the sticker 2 from among the plurality of stickers for use within the messaging service, a message including information about the selected sticker 2 may be transmitted to the server 150. In other example embodiments, the use history information may be any content type that was selected, used, uploaded, downloaded, transmitted, received, etc., by the user while utilizing the service. The server 150 may route the message to another user connected to a corresponding communication session. Here, the other user may be identified using an identifier "user B". Also, the server 150 may accumulate (e.g., collect, store, etc.) use history information of the user A by storing the selected sticker 2 in a database 520 in association with the user A.

Figure 6:
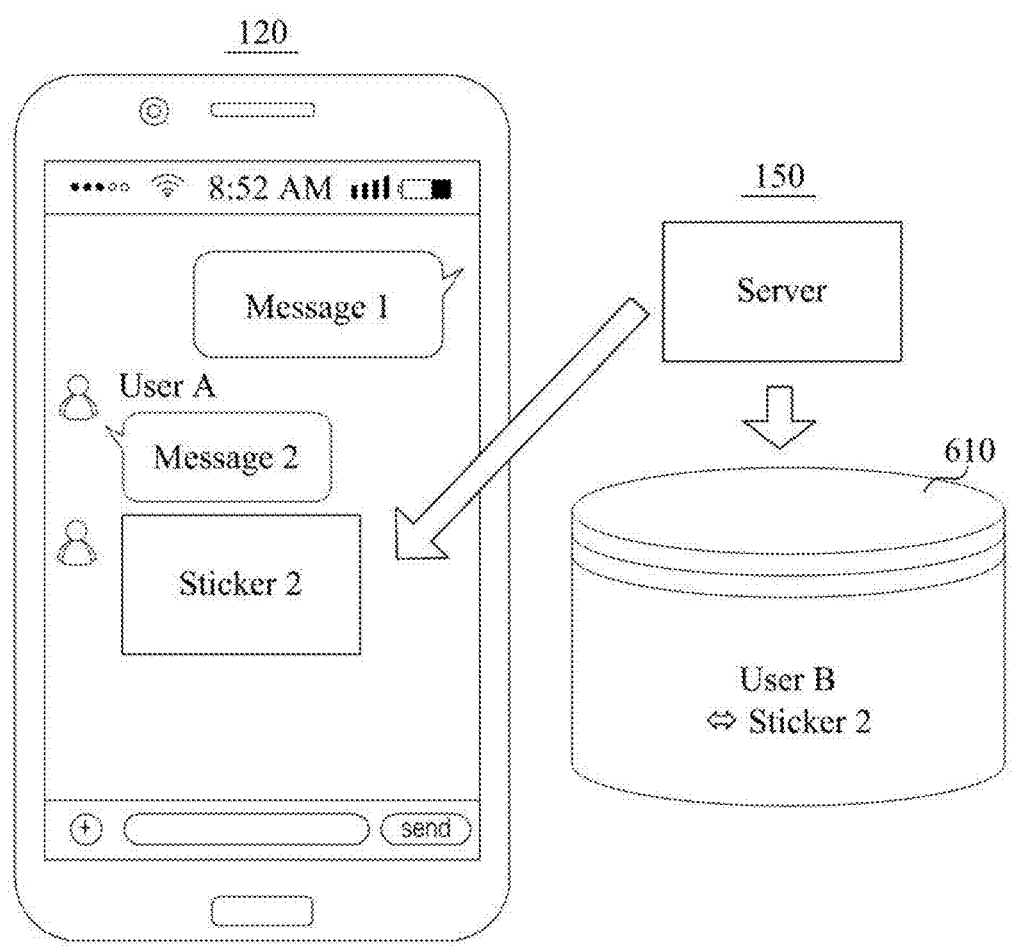
FIG. 6 illustrates another example of a process of storing use history information according to at least one example embodiment.

FIG. 6 illustrates another example of a process of storing use history information according to at least one example embodiment. As described above, the server 150 may accumulate not a sticker selected by a user but a sticker received through a communication session, as use history information. FIG. 6 illustrates an example in which a user of the electronic device 120 receives sticker 2 transmitted from the electronic device 110 over the server 150 and displays the received sticker 2 on a screen. Here, the user of the electronic device 120 may be identified using the identifier "user B". Here, the server 150 may accumulate use history information of the user B by storing the sticker 2 transmitted to the electronic device 120 of the user B in a database 610 in association with the user B.

In operation 450, the user verification information generator 340 may generate, as the user verification information, query data for extracting at least one object from the use history information and requesting selection information related to a single object from among a desired (or, alternatively, preset) number of objects including the extracted object. For example, the user verification information generator 340 may calculate as the selection information a number of times that a corresponding object is selected for each object selected by the user, a number of times that a corresponding object is transmitted for each object transmitted to the electronic device of the user based on the use history information, a number of times that a corresponding object has been downloaded to the electronic device of the user, etc., and may extract the at least one object based on the calculated number of times.

In operation 460, the generated user verification information may be transmitted to the electronic device using the transmission controller 450. The electronic device may transmit a reply to the received query data to the server 150.

In this case, in response to receiving, from the electronic device or the other electronic device, a reply indicating that the extracted object is selected as a reply to the query data, the user authenticator 360 may authenticate the user in operation 470.

Figure 7:
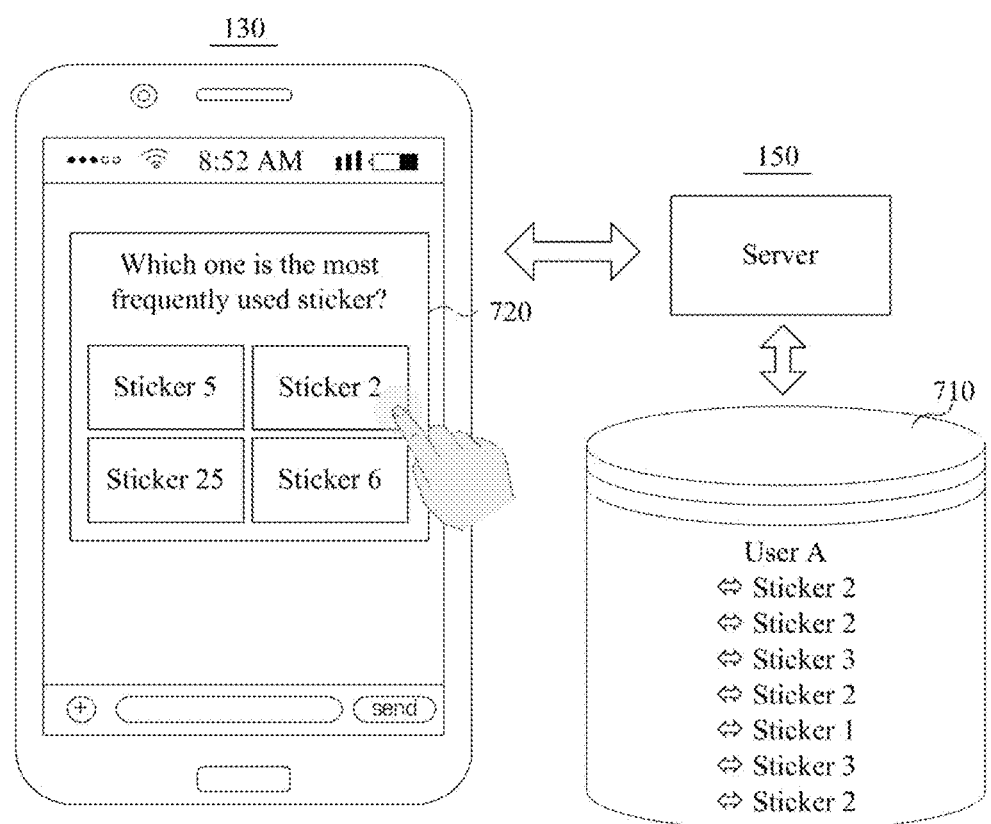
FIG. 7 illustrates an example of a process of authenticating a user based on the use history information according to at least one example embodiment.

FIG. 7 illustrates an example of a process of authenticating a user based on use history information according to at least one example embodiment. FIG. 7 illustrates an example of stickers stored in a database 710 in association with user A, but the example embodiments are not limited thereto and may include any other type of object related to the user's use history of the service. The example embodiment may include the use of a password-based user authentication as either a primary authentication method or a secondary authentication method. For example, the user A is connected to the server 150 using the electronic device 130 instead of using the existing electronic device 110. The user A may transmit an identifier "user A" and a password to the server 150 as login information through the electronic device 130. For example, a user interface for inputting an identifier and a password through a page transmitted from the server 150 to the electronic device 130 of the user A may be displayed on a screen of the electronic device 130. Once the user A inputs the identifier "user A" and the password through the user interface, the electronic device 130 may transmit the input identifier "user A" and password to the server 150.

In this case, the server 150 may perform a primary authentication, or secondary authentication (or tertiary authentication, etc.), of the user A based on the identifier "user A" and the password. Here, since the user A requests a service using the electronic device 130 (e.g., an electronic device that the user A may not have previously used to access the service with, or an electronic device that is not registered with the service, etc.) instead of using the existing electronic device 110, the server 150 may perform a secondary authentication process on the user A.

The server 150 may verify stickers that are stored in the database 710 in association with the identifier "user A", and may calculate a number of times that a corresponding sticker is selected for each sticker. Referring to FIG. 7, sticker 1 has been selected once, sticker 2 has been selected four times, and sticker 3 has been selected twice. The server 150 may extract the sticker 2 that has been most frequently selected by the user A, and may generate query data that includes other stickers, for example, sticker 5, sticker 6, and sticker 25, that may or may not have been previously selected by the user A, together with the sticker 2 corresponding to a correct answer. The generated query data may be transmitted from the server 150 to the electronic device 130 as user verification information.

FIG. 7 illustrates an example in which the generated query data is displayed on the screen of the electronic device 130 through a user interface element, such as a pop-up window 720, but the example embodiments are not limited thereto and may include other user interface elements such as notifications, alert messages, pop-under windows, system tray balloons, audio chimes, tactile feedback, etc. If the user A selects the sticker 2, for example, by tapping an area on which the sticker 2 is displayed on a touch screen, as a reply to the query data, the reply indicating that the sticker 2 is selected as the response and/or answer to the query data may be transmitted to the server 150. The server 150 is aware that the sticker 2 is one frequently used by the user A as a result of analyzing use history information. Thus, the server 150 may perform the secondary authentication regarding that the user A is the very user who has requested the service.

If the user A selects one of other stickers, for example, sticker 5, sticker 6, and sticker 25, on the pop-up 720, the reply is processed as an incorrect answer and thus, an authentication of the user A for a service request may fail.

Although FIG. 7 illustrates an example of generating query data that includes four stickers, it is only an example and the example embodiments are not limited thereto. The query data may also be generated such that a user may select two or more answers, instead of a single answer.

Likewise, if a sticker received by users is stored as use history information, the server 150 may generate query data requesting the user A to select a most frequently received sticker and may transmit the generated query data to the electronic device 130 having transmitted a service request, etc.

According to at least one example embodiment, a service provided from the server 150 may include a messaging service of setting a communication session for electronic devices and processing message transmission and reception between the electronic devices. Here, in operation 430, the information manager 320 may store and manage a message transmission/reception history for each communication session or a message transmission/reception history for each chat target at the message service as the use history information.

Figure 8:
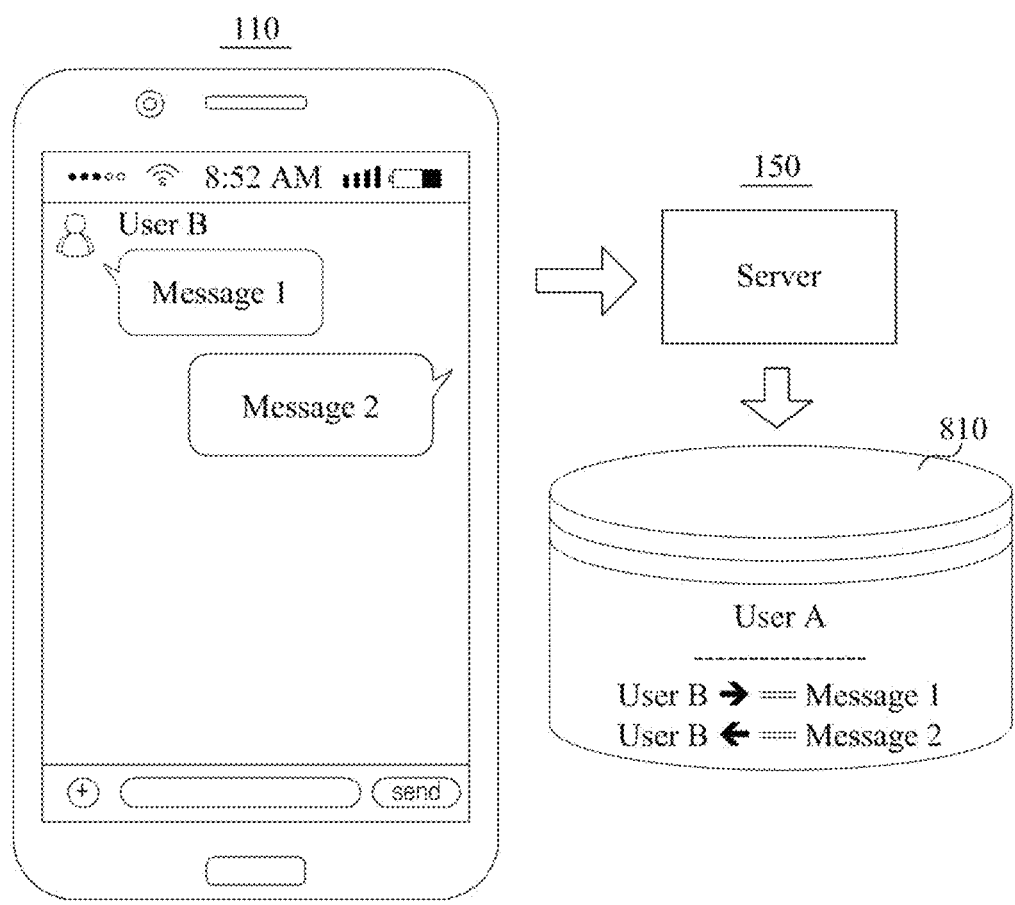
FIG. 8 illustrates still another example of a process of storing user history information according to at least one example embodiment.

FIG. 8 illustrates still another example of a process of storing use history information according to at least one example embodiment. FIG. 8 illustrates an example of a screen of the electronic device 110 on which user A chats with user B at a chatroom, but the example embodiments are not limited thereto and may include data transmitted using other messaging services, such as telephone calls, SMS messaging, videochats, email, SNS messaging, user posts on a forum or web portal, etc. Here, once the user A inputs a message at the chatroom, the input message may be transmitted to an electronic device of the user B through the server 150. The server 150 may store a message transmission/reception history of the user B in a database 810 in association with an identifier "user A". In FIG. 8, for example, 'user B→=message 1' may indicate that the user B has transmitted a message 1 to the user A, and 'user B←=message 2' may indicate that the user A has transmitted a message 2 to the user B.

Also, if the chatroom of FIG. 8 is a group chatroom in which a plurality of users have joined, such as the user A, the user B, and user C shown in FIG. 8, user data about the user C may be further stored in the database 810 in association with the identifier "user A". For example, history such as 'user C←=message 2' may be further stored in the database 810. Indicators with arrowheads on information stored in the database 810 are provided as representations are meant only to help understanding and may not be stored in reality.

In operation 450, the user verification information generator 340 may generate, as the user verification information, query data for extracting at least one communication session, chat target, etc., from the use history information based on the message transmission/reception history and through requests for selecting a single set of data from a desired number of sets of data including data about the extracted communication session and/or data about the extracted chat target(s).

For example, the user verification information generator 340 may calculate (and/or determine) at least one of: the number of times that a message is transmitted from the user to the chat target, and the number of times that a message is received by the user from the chat target for each chat target based on the use history information, may calculate the number of times that the electronic device of the user and an electronic device of the chat target are connected to the same communication session for each communication session, and may extract user data based on the calculated number of times, etc.

In operation 460, the generated verification information may be transmitted to the electronic device using the transmission controller 450. The electronic device may transmit a reply to the received query data to the server 150.

In operation 470, the user authenticator 360 may authenticate the user in response to receiving, from the electronic device and/or the other electronic device, a reply indicating that the data about the extracted communication session and/or the data about the extracted chat target is selected as a reply to the query data.

Figure 9:
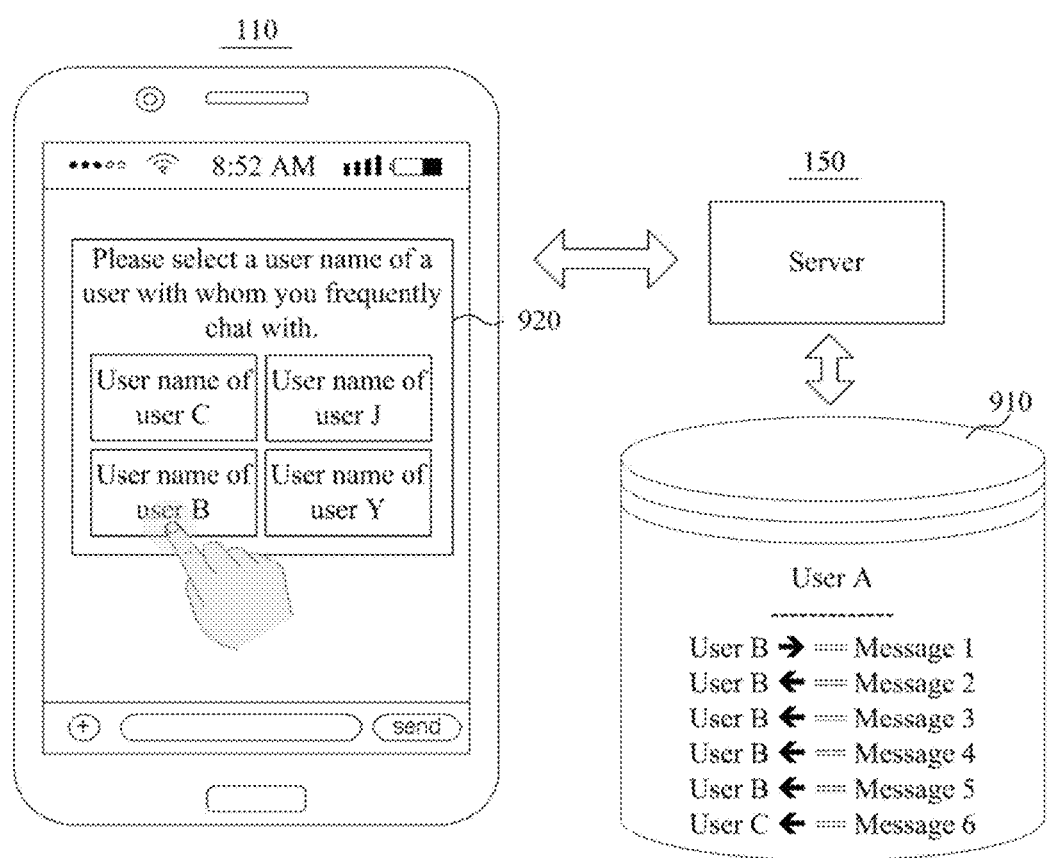
FIG. 9 illustrates another example of a process of authenticating a user based on user history information according to at least one example embodiment.

FIG. 9 illustrates another example of a process of authenticating a user based on use history information according to at least one example embodiment. Referring to FIG. 9, the server 150 may extract information related to user B that indicates that user B is a user with whom user A frequently (and/or most frequently) transmits and receives messages from (and/or communicates with) based on use history information stored in a database 910, along with information related to the other users that user A also communicates. Here, the server 150 may generate query data by using a user name, or other identifier, as data about the extracted user B and may transmit the generated query data to the electronic device 110 of the user A. A pop-up 920 displayed on a screen of the electronic device 110 indicates query data requesting selecting a user name, unique identifier, real identity, etc., of a user that the user A frequently chats with.

Here, for example, if the user A selects the user name of the user B, the server 150 may authenticate the user A based on a reply indicating that the user name of the user B is selected. Conversely, if the user A selects a user name of another user that is not the user that user A most frequently chats with, an authentication of the user A for the service request may fail. While the example embodiment discusses using the most frequently chatted with user as the authentication criteria, the example embodiments are not limited thereto and other authentication criteria may be used as well, such as the identity of the object that the user least frequently interacts with/uses, the identity of the object most recently interacted with/used, the identity of the object that was interacted with/used at a specific time and/or date, etc.

In addition to a user name, a variety of data registered to the server 150 about users, such as profile photos, telephone numbers, email addresses, real identities, etc., may be used as data about a chat target.

According to at least one example embodiment, query data may be generated based on data about an extracted communication session, such as query data that requests selecting a name of a chatroom to which a message is most frequently transmitted, query data that requests selecting a name of a most recently generated chatroom, etc., in addition to data about a chat target.

According to at least one example embodiment, history information about contents uploaded by a user to the server 150 or contents downloaded by the user from the server 150 may be used as use history information. In this case, the server 150 may generate query data that requests selecting content uploaded and/or downloaded by the user.

For example, in operation 430, the information manager 320 may store and manage information about content uploaded and/or downloaded by the user through the service as the use history information. In this case, the user verification information generator 340 may generate, as the user verification information, query data for extracting the content uploaded or downloaded by the user from the use history information and requesting selecting a single set of data from among a desired (or, alternatively, preset) number of sets of data including data about the extracted content. The user authenticator 370 may authenticate the user in response to receiving, from the electronic device and/or the other electronic device, a reply indicating that the data about the extracted content is selected as a reply to the query data.

Additionally, query data for requesting selecting a file name most recently uploaded by the user, query data for requesting selecting a file name most frequently downloaded by the user, etc., may be generated as the user verification information.

The aforementioned example embodiments may be combined. For example, the server 150 may include information about a sticker, an emoticon, etc., in a message transmission and reception history (e.g., message communication history and/or communication log). For example, the server 150 may include information indicating that a message (e.g., message 1) stored in the database 910 includes and/or is associated with another object (e.g., sticker 2). In this case, the server 150 may generate query data for requesting the selection of a sticker, an emoticon, and/or other object associated with at least one message previously transmitted and/or received as the most frequently transmitted to a specific chat target (and/or the least frequently transmitted, most recently transmitted, least recently transmitted, transmitted on a specific date and/or time, etc.). Also, the server 150 may generate query data for requesting selecting a sticker, an emoticon, etc. most frequently transmitted from the user at a specific chatroom, for example, a communication session, but the example embodiments are not limited thereto. Additionally, the server 150 may generate query data for requesting the user to select a sticker or an emoticon most frequently transmitted from a specific chat target to the user, etc.

As described above, a variety of query data from which the user may empirically induce a correct answer may be generated based on a type of information that is stored and managed as use history information of the user. Here, the server 150 may determine whether to authenticate the user based on a reply to the query data.

As described above, the use history information may be at least one of any type of information obtainable and recordable through interaction with the user at a service provided from the server 150 to the user using the electronic device. Additionally, log information of the user recorded at the service may be used as the use history information. For example, search log information at a search service, a message transmission and reception log or history at a messaging service, etc., may be used to generate user verification information.

In operation 430, the information manager 320 may store and manage data about at least one previous electronic device used by the user to utilize the service as the use history information. For example, if a user having been using a service through an electronic device A replaces the electronic device A with an electronic device B and uses the service through the electronic device B, the server 150 may store and manage information about the electronic device A as use history information.

According to at least one example embodiment, the user verification information generator 340 may generate, as the user verification information, query data for requesting selecting a single set of data from among a plurality of sets of data about a desired number of different electronic devices including the data about the at least one previous electronic device.

In operation 460, the generated user verification information may be transmitted to the electronic device using the transmission controller 450. The electronic device may transmit a reply to the received query data to the server 150.

In operation 470, the user authenticator 360 may authenticate the user in response to receiving, from the electronic device and/or the other electronic device, a reply indicating that the data about the previous electronic device is selected as a reply to the query data.

For example, the data about the previous electronic device may include photo data taken from an electronic device of the same model as the previous electronic device. In this case, the server 150 may provide photos of electronic devices corresponding to a different device model to the user, and may request the user to select a photo of the electronic device previously used by the user.

A model name of the electronic device, information regarding the features of the electronic device (e.g., color of the device, manufacturer of the device, software applications installed on the device, hardware specification of the device, etc.), dates and/or times that the electronic device was used, information regarding the location that the electronic device was used (e.g., home, office, etc.), and the like may be used in addition to a photo of the electronic device.

Figure 10:
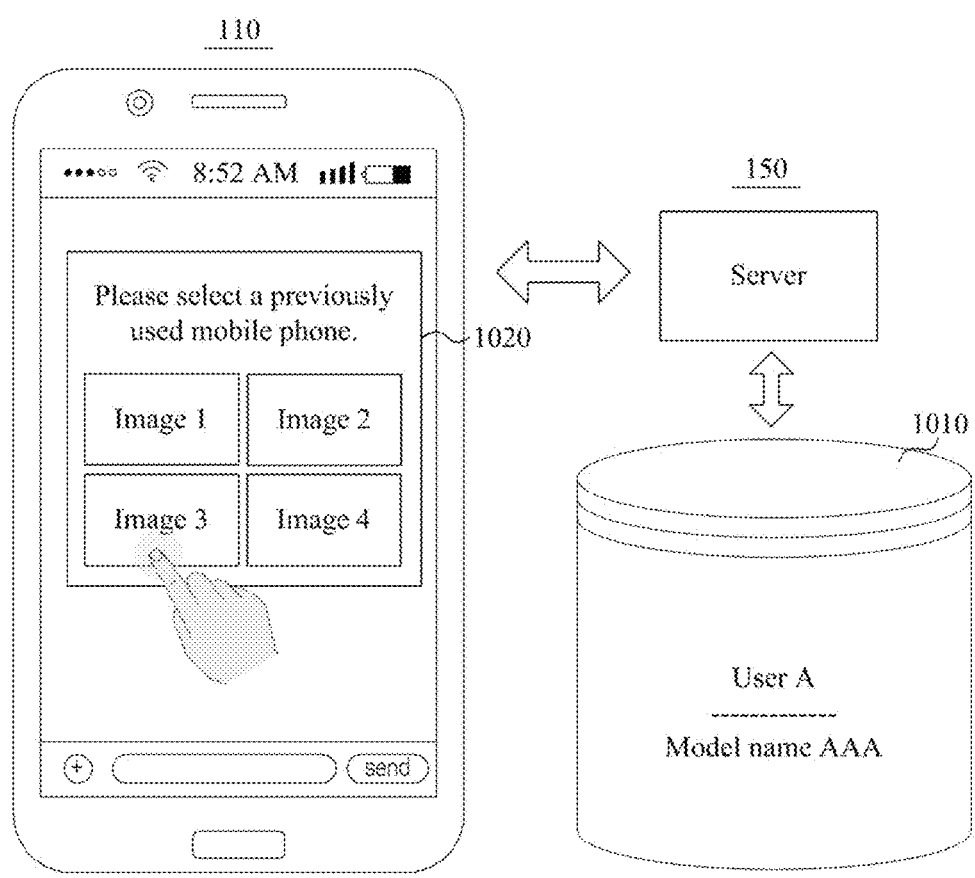
FIG. 10 illustrates still another example of a process of authenticating a user based on user history information according to at least one example embodiment.

FIG. 10 illustrates still another example of a process of authenticating a user based on use history information according to at least one example embodiment. In FIG. 10, the server 150 may extract, from a database 1010, a model name "AAA" of a previous electronic device used by user A to utilize a service. Also, the server 150 may generate query data for requesting selecting an image of the previous electronic device from among images of electronic devices corresponding to a different model based on the extracted model name "AAA" and may transmit the generated query data to the electronic device 110 of the user A. In FIG. 10, a pop-up 1020 displayed on a screen of the electronic device 110 indicates query data that requests the user A to select the previous electronic device of the user A. It is assumed that image 3 is a photo of an electronic device of the same model as the previous electronic device of the user A. In this example, in response to the user A selecting the image, 3, the user A for the service request may be authenticated at the server 150.

The server 150 may collect an Internet protocol (IP) address used at the electronic device of the user for connection to the service and may further use the collected IP address. For example, due to a characteristic of a mobile electronic device, an IP address used for connection to a service may vary based on a location of the mobile electronic device. However, when it is assumed that the radius of action of many users is constant, an IP address available within the radius of action may be limited. Accordingly, the server 150 may generate an IP network fingerprint based on collected IP addresses, and may get an auxiliary hint for verifying the identity of a user based on the IP network fingerprint.

To this end, the information manager 320 may collect an IP address used at the electronic device of the user for connection to the service and may further store and manage the collected IP address in a database.

The user authenticator 360 may verify an IP address used at the electronic device having requested the service or at the other electronic device for connection to the service using the identifier of the user. If the verified IP address is stored in the database, the user authenticator 360 may authenticate the user based on authentication information received together with the identifier of the user. Additionally, if the verified IP address is not stored in the database, the user authenticator 360 may perform a primary authentication of the user based on the authentication information received together with the identifier of the user and may perform a secondary authentication of the user by further using a reply to the user verification information.

In an example in which IP addresses collected for user A are '1.1.1.1', '1.1.2.1', and '1.10.1.1', if the user A attempts a log-in at the IP address '1.10.1.1', the server 150 may compare the IP addresses, may determine the login attempt of the user A as a normal login attempt, and may authenticate the user A through a primary authentication.

However, if the user A attempts a login at an IP address '10.1.1.1', the server 150 may determine the login attempt of the user A as a new and/or abnormal login attempt, and may perform a secondary authentication using a reply to the user verification information.

Figure 11:
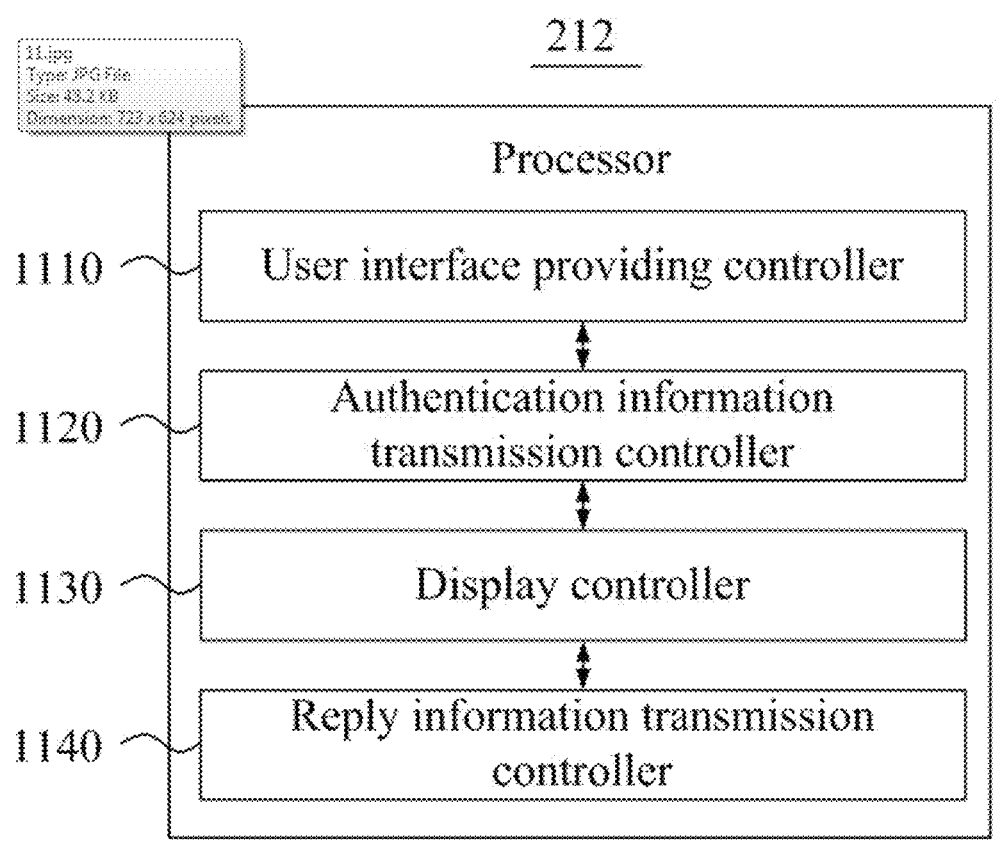
FIG. 11 is a block diagram illustrating an example of a constituent element includable in at least one processor of an electronic device according to at least one example embodiment.
Figure 12:
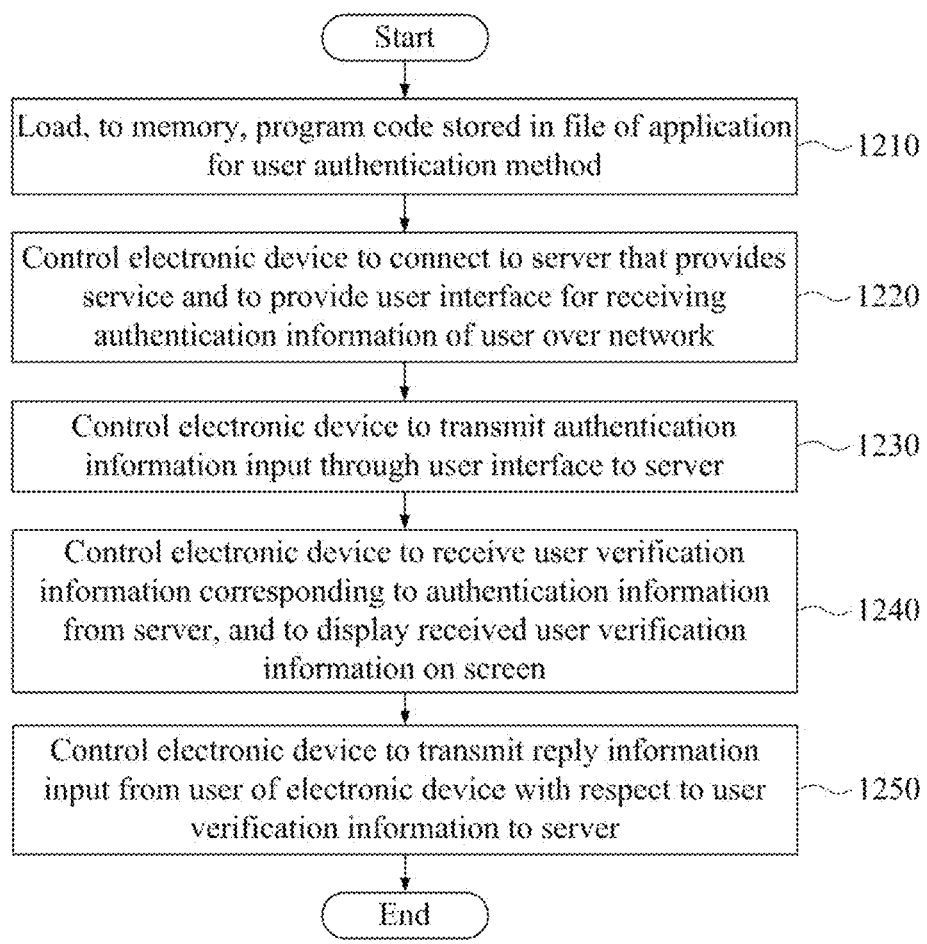
FIG. 12 is a flowchart illustrating an example of a method performed at an electronic device according to at least one example embodiment.

FIG. 11 is a block diagram illustrating an example of a constituent element includable in a processor of an electronic device according to at least one example embodiment, and FIG. 12 is a flowchart illustrating an example of a method performed at an electronic device according to at least one example embodiment.

Referring to FIG. 11, the processor 212 of the electronic device 110 may include a user interface providing controller 1110, an authentication information transmission controller 1120, a display controller 1130, and a reply information transmission controller 1140. The processor 212 and the constituent elements of the processor 212 may control the electronic device 110 to perform operations 1210 through 1250 included in the method of FIG. 12, and may be configured to execute at least one program code and an operating system (OS) included in the memory 211 of the electronic device 110. The at least one program code may include a code of an application that is installed and executed on the electronic device 110 cause the processor 212 to transform into a special purpose processor that is configured to provide a service of a server, for example, the server 150 to the electronic device 110. The application may be the same as the application installed and executed on the electronic device 110. The constituent elements of the processor 212 may represent different functions performed at the processor 212.

In operation 1210, the processor 212 may load, to the memory 211, a program code stored in a file of an application for the user authentication method. For example, the application may be installed on the electronic device 110 through a program file provided over the network 170. In response to executing the application installed on the electronic device 110, the processor 212 may load the program code to the memory 211. Here, the user interface providing controller 1110, the authentication information transmission controller 1120, the display controller 1130, and the reply information transmission controller 1140 included in the processor 212 may be configured to perform operations 1220 through 1250 by executing a portion corresponding to the program code loaded to the memory 211. Hereinafter, that the constituent elements of the processor 212 control the electronic device 110 may be understood as that the processor 212 controls other constituent elements of the electronic device 110. For example, the processor 212 may control the communication module 213 included in the electronic device 110 such that the electronic device 110 may communicate with the server 150 or another electronic device.

In operation 1220, the user interface providing controller 1110 may control the electronic device 110 to connect to the server 150 that provides a service and to provide a user interface for receiving authentication information of a user over the network 170. For example, the user interface may be a login interface for receiving an identifier and a password of the user corresponding to the service. Here, the authentication information of the user may include at least the identifier of the user.

In operation 1230, the authentication information transmission controller 1120 may control the electronic device 110 to transmit the authentication information input through the user interface to the server 150. Here, if a primary authentication is processed at the server 150 using the login information, the authentication information may further include the password.

In operation 1240, the display controller 1130 may control the electronic device 110 to receive user verification information corresponding to the authentication information from the server 150, and to display the received user verification information on a screen. For example, the server 150 may search for use history information of the user based on the identifier of the user included in the authentication information, may generate user verification information based on the found use history information, and may transmit the generated user verification information to the electronic device 110.

In operation 1250, the reply information transmission controller 1140 may control the electronic device 110 to transmit reply information input from the user of the electronic device 110 with respect to the user verification information to the server 150. Here, the server 150 may determine whether to authenticate the user based on the reply information.

The matters not described in FIGS. 11 and 12 may refer to the descriptions made above with reference to FIGS. 1 through 10.

According to at least some example embodiments, a server may perform an authentication and/or an additional authentication of a user based on use history of the user associated with a service when the server provides the service to an electronic device over a network.

The units described herein may be implemented using hardware components, and/or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system, the system comprising:
a memory configured to store computer-readable instructions; and
at least one processor configured to execute the computer-readable instructions to,
provide a service to an electronic device of an authenticated user over a network,
generate use history information of the user regarding the provided service,
store the generated use history information in a database in association with an identifier of the user, the storing including storing and managing data about at least one previous electronic device used by the user to utilize the service as the use history information,
search for the use history information of the user stored in the database in association with the identifier of the user, in response to a request for the service from the electronic device or another electronic device using the identifier of the user,
generate user verification information based on the use history information of the user, the generating including generating, as the user verification information, query data, the query data including
a request for selection of a single set of data from among a plurality of sets of data about a desired number of different electronic devices, the plurality of sets of data including the data about the previous electronic device, and
authenticate the user in response to receiving, from the electronic device or the other electronic device, a reply indicating that the data about the previous electronic device is selected as a reply to the query data, the data about the previous electronic device including photo data taken of an electronic device of the same model as the previous electronic device,
transmit the user verification information to the electronic device or the other electronic device, and
determine whether to authenticate the user in response to the request for the service based on a reply received from the electronic device or the other electronic device with respect to the user verification information.

2. The system of claim 1, wherein the at least one processor is further configured to execute the computer readable instructions to:
generate, as the user verification information, query data that includes at least one correct answer and at least one incorrect answer associated with the use history information of the user; and
authenticate the user in response to receiving, from the electronic device or the other electronic device, a reply in which the correct answer is selected for the query data.

3. The system of claim 1, wherein
the service includes a messaging service, the messaging service that is configured to
set a communication session for a plurality of electronic devices,
process message transmission and reception between at least two of the plurality of electronic devices through the set communication session,
provide a plurality of objects to the plurality of electronic devices, and
transmit information about a selected object at a first electronic device from among the plurality of objects to a second electronic device through the communication session; and
the at least one processor is further configured to execute the computer readable instructions to
store, as the use history information, information regarding the selected object, or an object transmitted to the electronic device of the user or the other electronic device through the communication session.

4. The system of claim 3, wherein the at least one processor is further configured to execute the computer readable instructions to:
generate, as the user verification information, query data, the query data including information extracted from at least one object from the use history information and requesting selection of a single object from among a desired number of objects including the extracted object; and
authenticate the user in response to receiving, from the electronic device or the other electronic device, a reply indicating that the extracted object is selected as a reply to the query data.

5. The system of claim 4, wherein the at least one processor is further configured to execute the computer readable instructions to:
calculate a number of times that a corresponding object was selected for each object selected by the user or a number of times that a corresponding object is transmitted for each object transmitted to the electronic device of the user, based on the use history information; and extract the at least one object based on the calculated number of times.

6. The system of claim 1, wherein the service includes a messaging service, the messaging service configured to
set a communication session for a plurality of electronic devices and process message transmission and reception between at least two of the plurality of electronic devices; and the at least one processor is further configured to execute the computer readable instructions to store a message transmission/reception history for at least one communication session or a message transmission/reception history for each chat target associated with the messaging service as the use history information.

7. The system of claim 6, wherein the at least one processor is further configured to execute the computer readable instructions to:

generate, as the user verification information, query data for extracting at least one communication session or chat target from the use history information based on the message transmission/reception history;

request selection of a single set of data from a desired number of sets of data including data about the extracted communication session or data about the extracted chat target; and authenticate the user in response to receiving, from the electronic device or the other electronic device, a reply indicating that the data about the extracted communication session or the data about the extracted chat target is selected as a reply to the query data.

8. The system of claim 7, wherein the at least one processor is further configured to execute the computer readable instructions to:

calculate at least one of a number of times that messages have been transmitted from the user to the chat target and a number of times that messages have been received by the user from the chat target for each chat target based on the use history information or to calculate a number of times that the electronic device of the user and an electronic device of the chat target are connected to the same communication session for each communication session; and extract user data based on the calculated number of times.

9. The system of claim 1, wherein the at least one processor is further configured to execute the computer readable instructions to:

collect an Internet Protocol (IP) address previously used at the electronic device of the user for connection to the service;

store the collected IP address in the database; and verify an IP address currently used at the electronic device having requested the service or the other electronic device for connection to the service using the identifier of the user, the verified IP address used to authenticate the user based on authentication information received together with the identifier of the user if the verified IP address is stored in the database; and perform a primary authentication of the user based on the authentication information received together with the identifier of the user, and perform a secondary authentication of the user by further using a reply to the user verification information if the verified IP address is not stored in the database.

10. The system of claim 1, wherein the at least one processor is further configured to execute the computer readable instructions to:

store information about content uploaded or downloaded by the user through the service as the use history information;

generate, as the user verification information, query data, the query data including data extracted regarding the content uploaded or downloaded by the user from the use history information, and a request for selecting a single set of data from among a desired number of sets of data including data about the extracted content; and authenticate the user in response to receiving, from the electronic device or the other electronic device, a reply indicating that the data about the extracted content is selected as a reply to the query data.

11. A user authentication method comprising:

providing, using at least one processor, a service to an electronic device of an authenticated user over a network;

generating, using the at least one processor, use history information of the user regarding the provided service;

storing, using the at least one processor, the generated use history information in a database in association with authentication information of the user, the storing including storing and managing data about at least one previous electronic device used by the user to utilize the service as the use history information;

searching, using the at least one processor, for the use history information of the user stored in the database in association with the authentication information of the user in response to a request for the service from the electronic device or another electronic device based on the authentication information of the user;

generating, using the at least one processor, user verification information based on the use history information of the user, the generating including generating, as the user verification information, query data, the query data including a request for selection of a single set of data from among a plurality of sets of data about a desired number of different electronic devices, the plurality of sets of data including the data about the previous electronic device, and authenticate the user in response to receiving, from the electronic device or the other electronic device, a reply indicating that the data about the previous electronic device is selected as a reply to the query data, the data about the previous electronic device including photo data taken of an electronic device of the same model as the previous electronic device;

transmitting, using the at least one processor, the user verification information to the electronic device or the other electronic device; and determining, using the at least one processor, whether to authenticate the user in response to the request for the service, based on a reply received from the electronic device or the other electronic device with respect to the user verification information.

12. The method of claim 11, wherein
the generating of the user verification information comprises generating, as the user verification information, query data that includes at least one correct answer and at least one incorrect answer associated with the use history information of the user; and
the determining whether to authenticate the user comprises authenticating the user in response to receiving, from the electronic device or the other electronic device, a reply in which the at least one correct answer is selected for the query data.

13. The method of claim 11, wherein
the service includes a messaging service configured to
set a communication session for a plurality of electronic devices,
process message transmission and reception between the plurality of electronic devices through the set communication session,
provide a plurality of objects to the plurality of electronic devices, and
transmit information about a selected object at a first electronic device from among the plurality of objects to a second electronic device through the communication session; and
the storing comprises storing, as the use history information, information about the selected object, or an object transmitted to the electronic device of the user through the communication session.

14. The method of claim 11, wherein
the service includes a messaging service configured to set at least one communication session for a plurality of electronic devices and process message transmission and reception between at least two of the plurality of electronic devices; and
the storing comprises storing a message transmission/reception history for the at least one communication session or a message transmission/reception history for each chat target of the messaging service, as the use history information.

15. The method of claim 11, wherein
the storing comprises storing data about at least one previous electronic device used by the user to utilize the service as the use history information;
the generating of the user verification information comprises generating, as the user verification information, query data,
the query data including a request for selection of a single set of data from among a plurality of sets of data about a desired number of different electronic devices including the data about the previous electronic device; and
the determining whether to authenticate the user comprises authenticating the user in response to receiving, from the electronic device or the other electronic device, a reply indicating that the data about the previous electronic device is selected as a reply to the query data.

16. The method of claim 11, wherein
the storing comprises collecting an Internet Protocol (IP) address used at the electronic device of the user for connection to the service and further storing the collected IP address in the database; and
the determining whether to authenticate the user comprises
verifying an IP address used at the electronic device having requested the service or used at the other electronic device for connection to the service using an identifier of the user,
authenticating the user based on authentication information received together with the identifier of the user if the verified IP address is stored in the database, and
performing a primary authentication of the user based on the authentication information received together with the identifier of the user and performing a secondary authentication of the user by further using a reply to the user verification information if the verified IP address is not stored in the database.

17. A user authentication method comprising:
connecting, using an electronic device, to a server configured to provide a service, and providing a user interface for receiving authentication information of a user over a network, the user interface including a request for selection of a single set of data from among a plurality of sets of data about a desired number of different electronic devices, the plurality of sets of data including the data about at least one previous electronic device used by the user to utilize the service;
transmitting, using the electronic device, authentication information input through the user interface to the server, the authentication information indicating that the data about the previous electronic device is selected, the data about the previous electronic device including photo data taken of an electronic device of the same model as the previous electronic device;
receiving, using the electronic device, user verification information corresponding to the authentication information;
displaying, using the electronic device, the received user verification information on a screen associated with the electronic device; and
transmitting, using the electronic device, reply information input from a user of the electronic device with respect to the user verification information to the server,
wherein the user verification information is generated at the server based on use history information of the user for the service, the use history information including the data about the at least one previous electronic device used by the user to utilize the service, and
whether to authenticate the user is determined at the server based on the reply information.

18. The method of claim 17, wherein the user verification information is generated as query data that includes at least one correct answer and at least one incorrect answer associated with the use history information of the user, and
the user is authenticated at the server if the reply information includes a reply indicating that the at least one correct answer is selected for the query data.

* * * * *